United States Patent
Resch et al.

(10) Patent No.: US 11,108,559 B2
(45) Date of Patent: Aug. 31, 2021

(54) PRODUCING PROOF OF RECEIPT, EXISTENCE AND OTHER DATA PROVENANCE EVIDENCE

(71) Applicant: International Business Machines Corporation, Armonk, NY (US)

(72) Inventors: Jason K. Resch, Chicago, IL (US); Vita Bortnikov, Haifa (IL); Michele Martino Franceshini, Croton on Hudson, NY (US); Ravi V. Khadiwala, Bartlett, IL (US); Michael E. Factor, Haifa (IL); Roberta Jo Cochrane, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 16/237,975

(22) Filed: Jan. 2, 2019

(65) Prior Publication Data
US 2020/0213117 A1    Jul. 2, 2020

(51) Int. Cl.
*H04L 9/32* (2006.01)
*H04L 9/06* (2006.01)
*H04L 29/08* (2006.01)

(52) U.S. Cl.
CPC .......... *H04L 9/3218* (2013.01); *H04L 9/0637* (2013.01); *H04L 9/0643* (2013.01);
(Continued)

(58) Field of Classification Search
CPC . H04L 67/1097; H04L 9/0637; H04L 9/0643; H04L 9/3218; H04L 9/3239;
(Continued)

(56) References Cited

U.S. PATENT DOCUMENTS 9,679,276 B1 *   6/2017   Cuende ................. H04L 9/3236
9,825,931 B2    11/2017   Johnsrud et al.
(Continued)

OTHER PUBLICATIONS

Zhang et al. "A Blockchain-based Process Provenance for Cloud Forensics" [Online], 2017 [Retrieved on: Jan. 15, 2021], www.ieee.org, Retrived from: < https://ieeexplore.ieee.org/stamp/stamp.jsp?tp=&arnumber=8322979&tag=1 > (Year: 2017).*

(Continued)

*Primary Examiner* — Eric W Shepperd
(74) *Attorney, Agent, or Firm* — Anthony V England; Andrew D. Wright; Roberts, Calderon, Safran & Cole, P.C.

(57) ABSTRACT

A method of integrating a distributed ledger represented by a blockchain with a distributed storage network (DSN) begins by sending a proof of existence request to the DSN, the proof of existence request including an object name, an object version, a start time and an end time. The method continues by reading the object metadata for the sent object name. The method continues by checking a revision history from object metadata associated with the sent object name to ensure the object existed by the start time through the end time with no deletions and, if the object did not exist by the start time through the end time with no deletions, rejecting the proof of existence request and returning an error response. If the object did exist by the start time on through the end time with no deletions, the method continues by producing and returning an attestation comprising verification information related to the object.

14 Claims, 9 Drawing Sheets

(52) U.S. Cl.
CPC .......... *H04L 9/3247* (2013.01); *H04L 9/3268* (2013.01); *H04L 67/1097* (2013.01); *H04L 2209/38* (2013.01)

(58) Field of Classification Search
CPC ... H04L 9/3247; H04L 9/3268; H04L 9/3297; H04L 2209/38
See application file for complete search history.

(56) References Cited

U.S. PATENT DOCUMENTS

| | | | |
|---|---|---|---|
| 10,026,118 B2 | 7/2018 | Castinado et al. | |
| 10,681,083 B2* | 6/2020 | Xie | H04L 9/3239 |
| 10,698,879 B1* | 6/2020 | Todd | H04L 67/1097 |
| 10,783,272 B2* | 9/2020 | Matetic | G06Q 20/065 |
| 2007/0079083 A1* | 4/2007 | Gladwin | G06F 21/6227 |
| | | | 711/154 |
| 2010/0325005 A1* | 12/2010 | Benisti | G06Q 40/12 |
| | | | 705/26.1 |
| 2014/0012899 A1* | 1/2014 | Baptist | G06F 16/168 |
| | | | 709/203 |
| 2017/0026329 A1* | 1/2017 | Benisti | H04L 51/00 |
| 2017/0331635 A1* | 11/2017 | Barinov | H04L 9/3236 |
| 2018/0117446 A1* | 5/2018 | Tran | A42B 3/0433 |
| 2018/0167198 A1* | 6/2018 | Muller | G06F 21/44 |
| 2018/0336552 A1* | 11/2018 | Bohli | H04L 9/3236 |
| 2019/0018887 A1* | 1/2019 | Madisetti | H04L 9/3247 |
| 2019/0028264 A1* | 1/2019 | Bisti | A63F 13/71 |
| 2019/0081793 A1* | 3/2019 | Martino | H04L 9/0894 |
| 2019/0238327 A1* | 8/2019 | Li | G06F 21/64 |
| 2019/0279206 A1* | 9/2019 | Song | G06F 16/1834 |
| 2020/0134066 A1* | 4/2020 | Yegorin | H04L 9/3239 |
| 2020/0142986 A1* | 5/2020 | Ragnoli | H04L 9/0894 |
| 2020/0293679 A1* | 9/2020 | Handy Bosma | H04L 9/0643 |

OTHER PUBLICATIONS

Crosby et al. "Blockchain technology: Beyond bitcoin" [Online], 2016 [Retreived on: Jan. 15, 2021], Sutardja Center for Entrepreneurship & Technology Berkeley Engineering, Retrieved from: < https://j2-capital.com/wp-content/uploads/2017/11/AIR-2016-Blockchain.pdf > (Year: 2016).*

NewsBTC, "Proof of Existence" [Online], Nov. 23, 2018 [Retrieved on: Jan. 15, 2021], Internet archive [www.archive.org], Retrieved from : < https://web.archive.org/web/20181123060221/https://www.newsbtc.com/proof-of-existence/ > (Year: 2018).*

Chen, et al.; An improved P2P File System Scheme based on IPFS and Blockchain; IEEE International Conference on Big Data (BIGDATA); 2017; pp. 2652-2657.

Linn, et al.; Blockchain for Health Data and Its Potential Use in Health IT and Health Care Related Research; ONC/NIST Use of Blockchain for Healthcare and Research Workshop; 2016; Gaithersburg, MD; 10 pgs.

Mainelli, et al.; Sharing ledgers for sharing economies: an exploration of mutual distributed ledgers (aka blockchain technology); EY Global Financial Services Institute; Winter 2015; vol. 3, Issue 3; 47 pgs.

Ruckeshauser; Typology of Distributed Ledger Based Business Models; In Proceedings of the 25th European Conference on Information Systems (ECIS); Jun. 5-10, 2017; 17 pgs.

Third, et al.; Towards the Temporal Streaming of Graph Data on Distributed Ledgers; European Semantic Web Conference; 2017; pp. 327-332.

* cited by examiner

PRODUCING PROOF OF RECEIPT, EXISTENCE AND OTHER DATA PROVENANCE EVIDENCE

BACKGROUND

The technology described herein relates to integrating a blockchain (distributed ledger) within an Object Storage System. Large objects may need to be unloaded into an Object Storage System so that the distributed ledger can remain small (which is efficient because the ledger may be highly replicated). However, one issue includes proving the existence of those items offloaded to the Object Storage System, but referenced by the distributed ledger.

SUMMARY

Embodiments of the present invention disclose a computer-implemented method, a system, and a computer program product for enhanced functionality for a distributed/dispersed storage system (DSN) to enable accessors to produce cryptographically verifiable receipts for operations that are performed against the system (such as uploads or deletions of objects), with the receipts including time, digital signature, hash, author, along with certifying information generated by the DSN.

DETAILED DESCRIPTION

Figure 1:
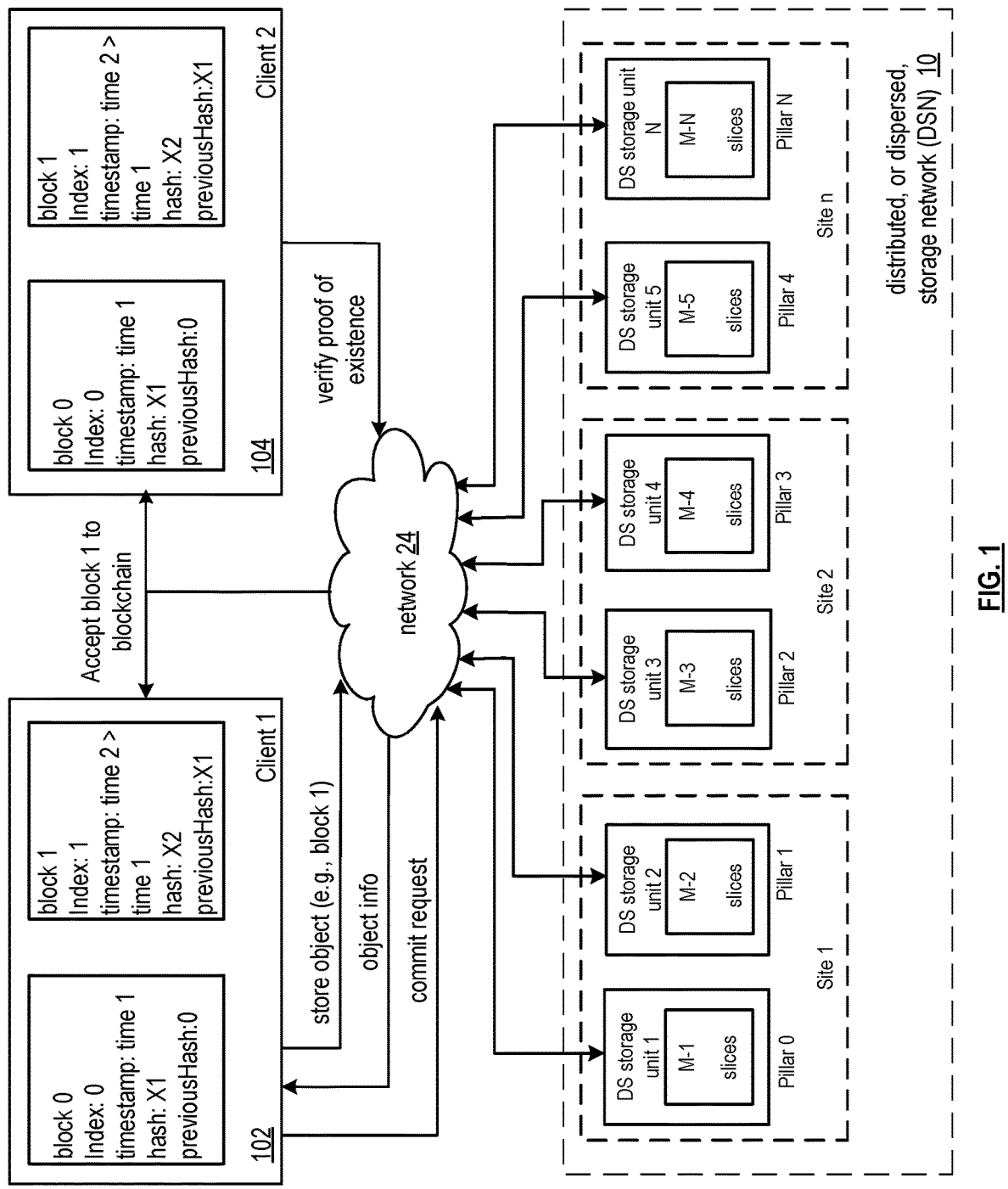
FIG. 1 is a block diagram illustrating an embodiment of a DSN supporting blockchain technology according to various embodiments of the present invention.

According to an embodiment of the present invention, enhanced functionality is provided for a distributed/dispersed storage system (DSN) to enable accessors to produce cryptographically verifiable receipts for data object operations that are performed against the system (such as uploads, or deletions of objects), with the receipts including time, signature, hash, author, along with certifying information generated by the DSN. Descriptions and functionality of the DSN are provided in greater detail in commonly owned U.S. Pat. No. 8,566,354, entitled "STORAGE AND RETRIEVAL OF REQUIRED SLICES IN A DISPERSED STORAGE NETWORK", hereby incorporated by reference in its entirety.

To augment capabilities and efficiency of integrating a DSN memory with a Distributed Ledger (DL), functionality of distributed storage (DS) processing units operating within the DSN memory is extended with various functions to better support verification methods of peer entities when checking ledger entries (LEs). These augmented functions of the DS processing unit involve computing unforgeable signatures attesting to one of more facts or states concerning the presence and existence of objects stored in the DSN memory. These attestations include "Proof of Existence" and "Proof of Deletion". They are produced when a requester sends a request to a DS processing unit indicating the type of attestation desired, the object name, and optionally a point in time or a time range. For example, the requester may, after writing an object, request a "Proof of Existence" attestation for the object uploaded.

A proof of existence request takes the object name and optionally an object version, optionally a start time, and optionally and end time. When the object version is not indicated, the DS processing unit considers the existence of any object version over the time range with the associated object name. When the start time is not supplied it is assumed to be the current time. When the end time is not supplied, it is assumed to be equal to the start time. The DS processing unit then reads the object metadata for the given object, and checks its revision history to ensure that the object existed at the point in time indicated by "start time", and that it existed continuously (without being deleted) on through the point in time of "end time". If the object of the indicated name (and unique version ID, if specified) did not exist continuously for the entire indicated time range, or if it did not exist at the point in time indicated by start time, then the DS processing unit will reject the request and return an error response rather than an attestation. If the object did exist for the indicated time range (without being deleted, or overwritten) throughout the entire time range, then the DS processing unit will produce an attestation. This attestation will include one or more of: The object name, the object version (if specified), the object hash, the time range, the DS processing unit ID, the requester ID, the time the object was written, and the time the request was processed. Additionally, the attestation will include verification information, such as a digital signature of the proceeding information and a digital certificate containing the public key used to verify the signature. This attestation can be included in an LE record, or may be generated on the fly by peer entities that service the DL who wish to verify the consistency of an LE or perform audit functions.

A proof of deletion request takes the object name, optionally an object version, optionally a start time, and optionally and end time. When the object version is not indicated, the DS processing unit requires the non-existence of any version over the time range with the associated object name. When the start time is not supplied it is assumed to be the current time. When the end time is not supplied, it is assumed to be equal to start time. The DS processing unit then reads the object metadata (or in the case of deletion, it's "tombstone" object) for the given object, and checks its revision history to ensure that the object did not existed at the point in time indicated by "start time", and that it never existed continuously (without being written) on through the point in time of "end time". If the object of the indicated name (and unique version ID, if specified) did exist at any time for the entire indicated time range, or if it existed at the point in time indicated by start time, then the DS processing unit will reject the request and return an error response rather than an attestation. If the object did not exist for the indicated time range (without being written, or written and deleted) throughout the entire time range, then the DS processing unit will produce an attestation.

The attestation will include one or more of: the object name, the object version (if specified), the object hash, the time range, the DS processing unit ID, the requester ID, the time the object was deleted and the time the request was processed. Additionally the attestation will include verification information, such as a digital signature of the proceeding information and a digital certificate containing the public key used to verify the signature. This attestation can be included in an LE record, or may be generated on the fly by peer entities that service the DL who wish to verify the consistency of an LE or perform audit functions.

In one embodiment, the DSN memory retains object metadata even when the object content is itself deleted. This object metadata retains the entire version history for the object, when each versions is written, and when each version is deleted. The retention of these times being necessary for the DS processing unit to satisfy the requests. Note that start and end times can also be indicated with negative or positive infinity to enable proof that an object never existed. For example, an unfavorable server navigation history based on a second blockchain would block delivery of the tailored content, and/or generate an error notification for the user (client). Generally, in accordance with blockchain related technology, information is distributedly stored across a number of computing devices and any changes, transactions, modifications, etc. to the information are recorded chronologically thereby forming an immutable chain (hence the terminology blockchain) that is sometimes also referred to as a ledger, digital ledger, etc. This ledger is distributed across many participant computing devices (e.g., as a distributed ledger) such that copies of the information exist and are simultaneously updated and only updated when there is 100% consensus among those computing devices that serve as miners, verifiers of the digital ledger.

FIG. 1 is a block diagram illustrating an embodiment of a DSN supporting blockchain technology according to various embodiments. Dispersed storage network (DSN) 10 includes at least DSN memory apportioned into (sites (1-$n$)) each with a subset of a plurality of DS storage units (1-N). Each storage unit also includes a plurality of DSN memories M-1 through M-N (e.g., hard drives, static memory, solid state memory, optical memory, etc.) storing encoded data slices. Dispersed storage network (DSN) 10 also includes a DSN processing unit (within client systems such as computing devices and/or within DS storage units themselves).

The DSN processing units encode data objects into encoded data slices for dispersed/distributed storage across DSN storage devices (1-N) and further assist in processing the proof of existence request. During a read operation the DSN processing units decode retrieved encoded data slices into the data objects.

In this example embodiment, six DS storage units (storing pillar 0-pillar N) are located at three different sites; pillars 0-1 are located at site 1, pillars 2-3 are located at site 2, and pillars 4-N are located at site N. Each DSN storage site (1-$n$) can include the same number or a different number of storage units k.

The DSN includes a multitude of storage nodes for storage of data objects (as encoded data slices). The multitude of storage nodes may be organized into one or more storage node sets. Each storage node of the plurality of storage nodes may be implemented utilizing at least one of a storage server, a storage unit, a storage module, a memory device, a memory, a distributed storage (DS) unit, a DS processing unit, a distributed storage and task (DST) execution unit, a user device, a DST processing unit, and a DST processing module. Additional descriptions and functionality of the DSN are provided in commonly owned U.S. Pat. No. 8,566,354, entitled "Storage and retrieval of required slices in a dispersed storage network", hereby incorporated by reference in its entirety.

Client 102 (Client 1) includes a copy of a distributed ledger reflected as a series of blockchain blocks (shown as 1 and 2, but not limited thereto). As further discussed in association with FIGS. 5A and 5B et al., in accordance with blockchain related technology, information is distributedly stored across a number of computing devices and any changes, transactions, modifications, etc. to the information are recorded chronologically thereby forming an immutable chain (hence the terminology blockchain) that is sometimes also referred to as a ledger, digital ledger, etc. This ledger is distributed across many participant computing devices (e.g., as a distributed ledger) such that copies of the information exist and are simultaneously updated and only updated when there is 100% consensus among those computing devices that serve as miners, verifiers of the digital ledger.

The blockchain is composed of a number of blocks such that each block is particularly related to a prior block in the blockchain. For example, a block 0 respectively includes an index (e.g., 0), timestamp (e.g., time 1), a hash (e.g., X1), and a previous Hash (e.g., 0, because this is the first block in the blockchain and there is no previous Hash corresponding to a prior block). Then, a next block 1 respectively includes an index (e.g., 1), timestamp (e.g., time 2, which is greater than time 1), a hash (e.g., X1), and a previous Hash (e.g., X1, which is the hash, X1, of the prior block in the blockchain). Similarly, a next block 2 respectively includes an index (e.g., 2), timestamp (e.g., time 3, which is greater than time 2), a hash (e.g., X3), and a previous Hash (e.g., X2, which is the hash, X1, of the prior block in the blockchain).

In one example, client 102 (Client 1) seeks to add block 1 to the blockchain, but also seeks to offload this large data object to DSN 10. Client 102 stores the object (block 1) into an object store (e.g., DSN data storage structure as a selected plurality of DS storage units (1-N)) storing a set of encoded data slices). Client 102 receives object info from DSN 10, such as an object-id/object name/Access URL. Client 102, wanting to commit block 2 to the blockchain, sends a commit record to the DSN (e.g., to a DS processing unit). The client commit record includes any of: an object-ID/object name/access URL, a hash of the object payload, a digital signature of the payload (computed by the client/ document author), and certificate/public key of the author, an access token or access credentials (necessary for reading the object), or metadata attributes of the object for quick verification (e.g., an electronic tag (ETAG)/message-digest algorithm (MD5)) of the object accessible from the object's metadata).

However, as copies of the blockchain are only updated when there is 100% consensus among computing devices that serve as miners or verifiers of the digital ledger, a verification process is needed. As shown, client 104 (client 2) acts as a peer to verify the record before accepting it. In one embodiment, peers can take a multi-level approach to verify the record before accepting it, including any of: accept the record at face value without consulting with the object store, performing a "head" request to the object store to verify metadata (and ETAG/MD5) of object matches the commits record, issue an object read to recompute the hash of the object matches the commits record or issue an object read to verify the digital signature of a purported author as indicated in the commits record. If a quorum of peers accept the commits record using their configured level of verification, the addition of the block (e.g., block 1) is accepted to the blockchain and future copies (distributed ledger) thereof.

Figure 2:
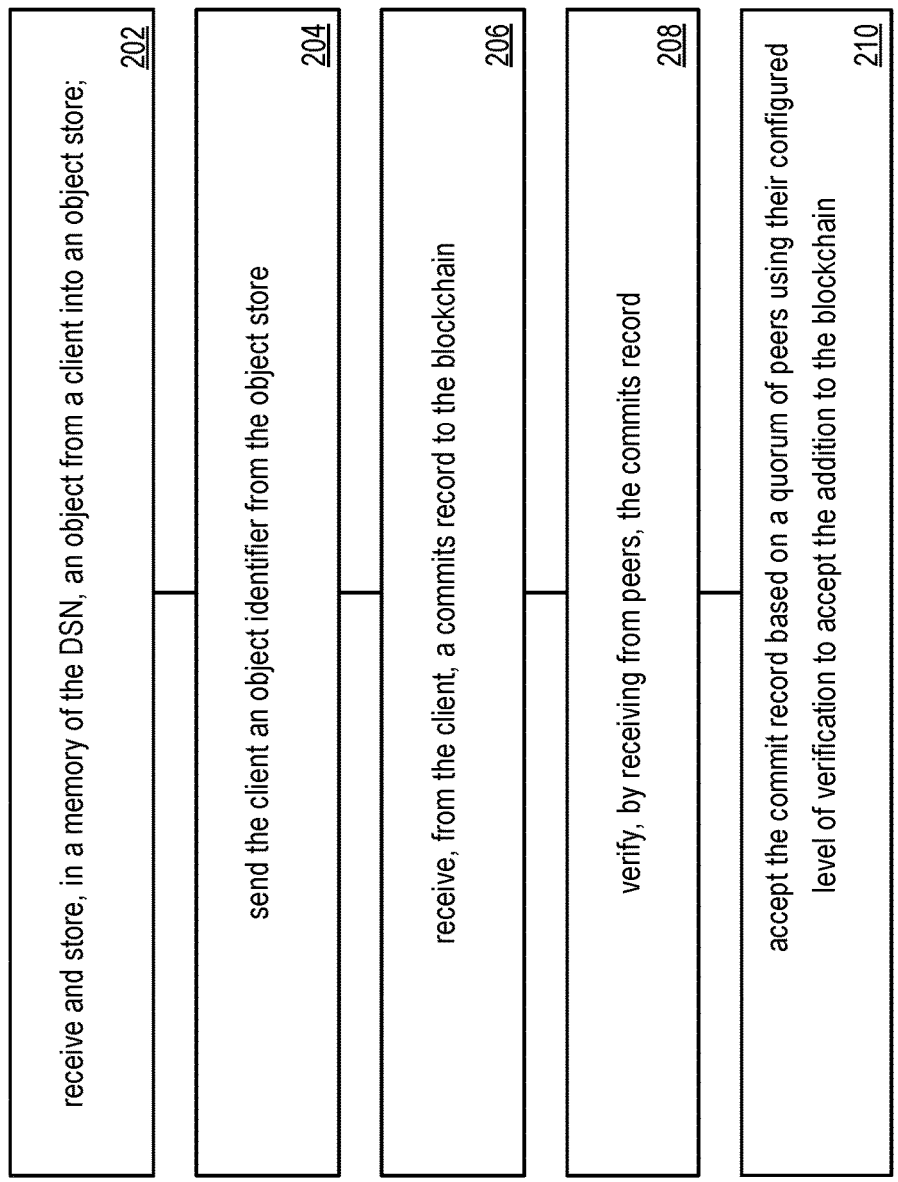
FIG. 2 is a diagram illustrating an embodiment of a DSN supporting blockchain technology according to various embodiments of the present invention.

FIG. 2 is a diagram illustrating an embodiment of a DSN supporting blockchain technology. One or more computing devices and associated operation instructions include a method to integrate a blockchain (distributed ledger) into a DSN. In step 202, the DSN receives and stores, in a data store such as DSN memory (e.g., DSN data storage structure as a selected plurality of DS storage units (1-N)) storing a set of encoded data slices), an object from a client.

In step 204, the client receives object info from DSN 10, such as object-id/object name/Access URL.

In step 206, the client, wanting to commit the object to the blockchain, sends a commit record to the DSN (e.g., to a DS processing unit). The client commit record includes any of: an Object-ID/Object name/Access URL, a hash of the object payload, a digital signature of the payload (computed by the client/document author), and certificate/public key of the author, an access token or access credentials (necessary for reading the object), or metadata attributes of the object for quick verification (e.g., an electronic tag (ETAG)/message-digest algorithm (MD5)) of the object accessible from the object's metadata.

However, as copies of the blockchain are only updated when there is 100% consensus among computing devices that serve as miners or verifiers of the digital ledger, a peer-based verification is needed. As shown in step 208, a peer attempts to verify the record before accepting it. In one embodiment, peers can take a multi-level approach to verify the record before accepting it, including any of: accept the record at face value, without consulting with the object store, performing a "head" request to the object store to verify metadata (and ETAG/MD5) of object matches the commits record, issue an object read to recompute the hash of the object matches the commits record or issue an object read to verify the digital signature of a purported author as indicated in the commits record. If a quorum of peers accept the commits record using their configured level of verification, in step 210, the addition of the block (e.g., block 1) is accepted to the blockchain and future copies (distributed ledger) thereof.

Figure 3:
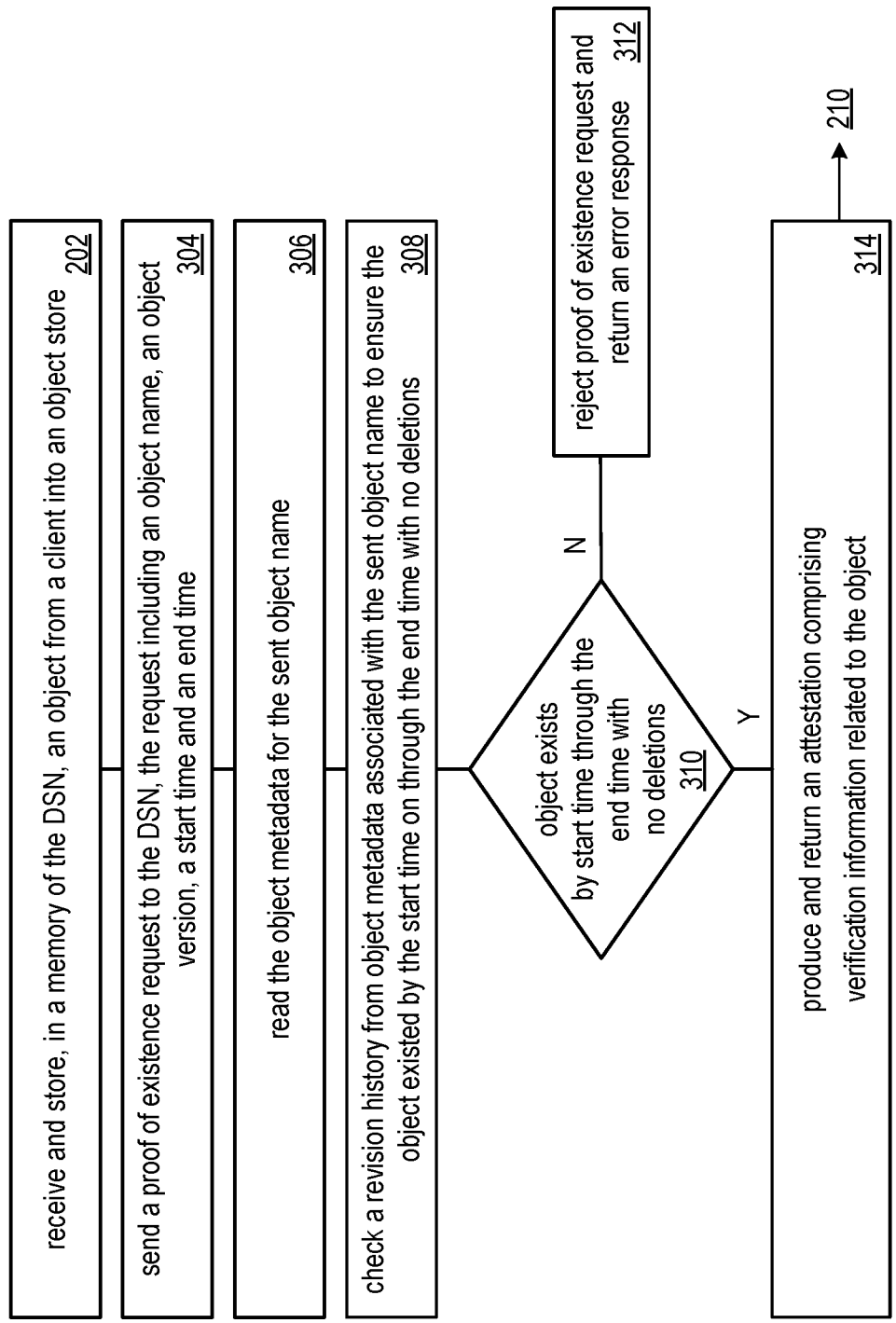
FIG. 3 is another diagram illustrating an embodiment of a DSN supporting blockchain technology according to various embodiments of the present invention.

FIG. 3 is another diagram illustrating an embodiment of a DSN supporting blockchain technology. As shown, once the data object has been stored in the DSN (step 202), a verification process from peer systems takes place to accept the block into the blockchain and future copies thereof.

Steps 304-314 provide greater detail of the verification process (steps 208 and 210) as shown in FIG. 2. In step 304, one or more peers send a proof of existence request to the DSN, the request including an object name, an object version, a start time and an end time. In step 306, object metadata for the sent object name is read. In step 308, a revision history from object metadata associated with the sent object name is checked to ensure the object existed by the start time on through the end time with no deletions. In step 310, a determination is made to see if the object exists, by the start time on through the end time, with no deletions. If the object did not exist, by the start time on through the end time with no deletions, the proof of existence request is returned as an error response at step 312, and the object is not accepted to the blockchain. In step 314, if the object did exist, by the start time on through the end time with no deletions, an attestation comprising verification information related to the object is returned and the block is committed to the blockchain (step 210).

Figure 4B:
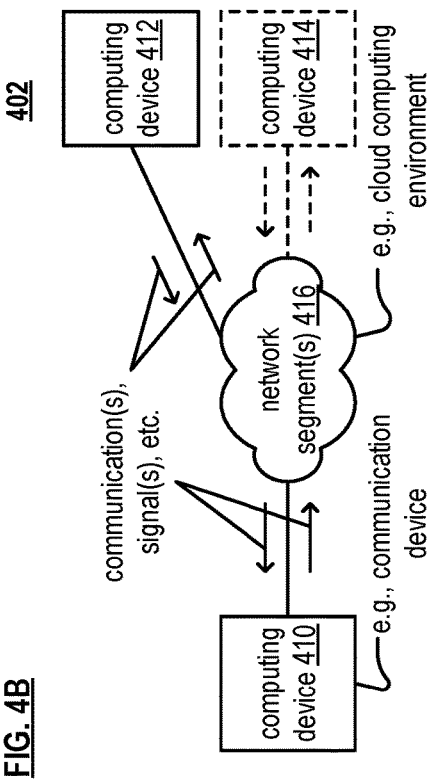
FIG. 4B is a diagram illustrating an embodiment of one or more communication systems according to various embodiments of the present invention.
Figure 4D:
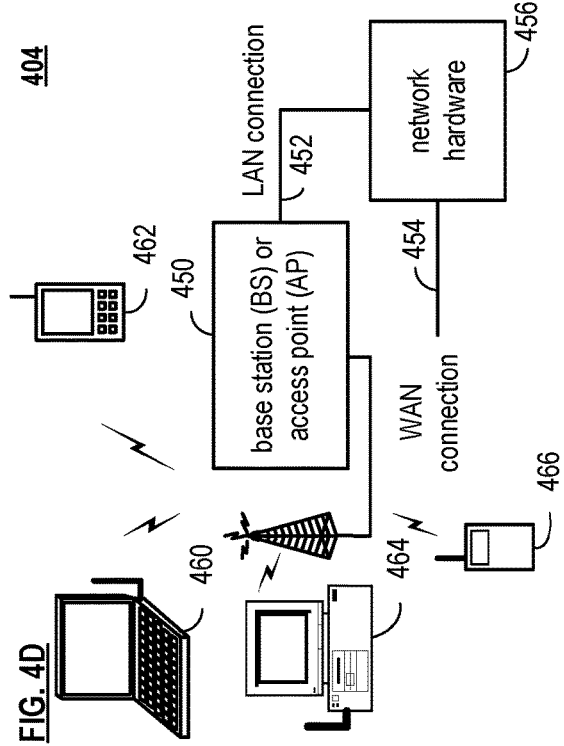
FIG. 4D is a diagram illustrating an embodiment of a wireless communication system according to various embodiments of the present invention.
Figure 4A:
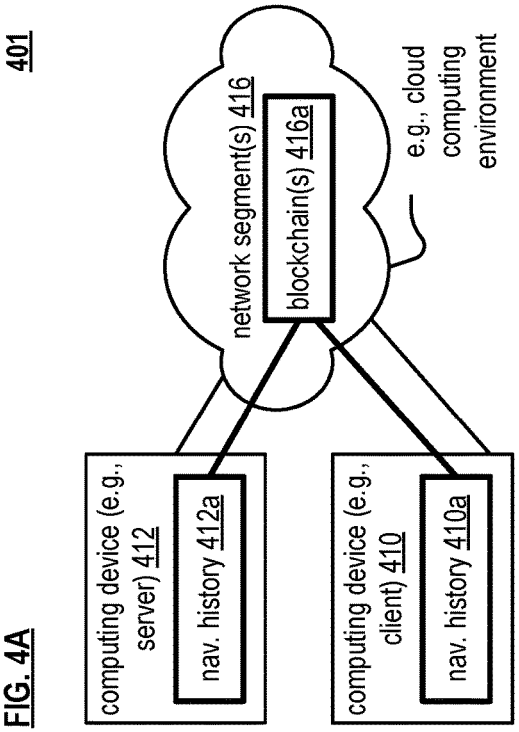
FIG. 4A is a diagram illustrating an embodiment of one or more communication systems supporting blockchain technology according to various embodiments of the present invention.

FIG. 4A is a diagram illustrating an embodiment 401 of one or more communication system supporting blockchain technology according to various embodiments of the present invention. One or more computing devices (e.g., computing device 410, computing device 412, etc.) is configured to support communications via one or more other computing devices and/or one or more network segments 416. In one example, the computing device 410 is in communication with a computing device 412 via the one or more network segments 416. For example, the computing device 410 is associated with a first user, and the computing device 412 is associated with a second user. The one or more network segments 416 may be implemented in accordance with a cloud computing environment 50 such as described with reference to FIG. 7, and one or more network segments 416 may include one or more other computing devices therein (e.g., nodes, routers, gateways, servers, relays, transcoders, etc.) in some examples and/or embodiments.

In an example of operation and implementation, a user operates the computing device 410 to perform browsing or navigation via one or more communication systems (e.g., the Internet, an intranet, a proprietary network, a private network, a public network, etc.) via the one or more network segments 416. Also, the same user or another user operates the computing device 412 to perform browsing or navigation via the one or more communication systems via the one or more network segments 416. For example, when browsing or navigation is based on and performed via a computing device, that respective computing device tracks navigation history and stores it. For example, the computing device 410 logs, tracks, stores, etc. navigation history 410*a* in accordance with browsing or navigation as performed by the computing device 410, and computing device 412 logs, tracks, stores, etc. navigation history 412*a* in accordance with browsing or navigation as performed by the computing device 412. Such navigation history stored on a computing device locally may sometimes be referred to as client navigation history.

In addition, such navigation history of one or more computing devices is also stored in the one or more network segments 416. Such navigation history stored remotely on one or more other computing devices within the one or more network segments 416 may sometimes be referred to as sever navigation history. In some examples, the navigation history of one or more computing devices (e.g., navigation history 410*a* of computing device 410, navigation history 412*a* of computing device 412, etc.) is stored via blockchain technology. For example, multiple computing devices within the one or more network segments 416 operate to store the navigation history 410a of computing device 410 and/or the navigation history 412a of computing device 412 in accordance with blockchain technology. Generally, in accordance with blockchain related technology, information is distributedly stored across a number of computing devices and any changes, transactions, modifications, etc. to the information are recorded chronologically thereby forming an immutable chain (hence the terminology blockchain) that is sometimes also referred to as a ledger, digital ledger, etc. This ledger is distributed across many participant computing devices (e.g., as a distributed ledger) such that copies of the information exist and are simultaneously updated and only updated when there is 100% consensus among those computing devices that serve as miners, verifiers of the digital ledger. Additional details regarding blockchain related technology is also provided with reference to FIG. 5A, FIG. 5B, etc., among others herein.

In an example of operation and implementation, a computing device (e.g., such as the computing device 410, the computing device 412, or another computing device that is implemented in accordance with the one or more network segments 416) includes an interface configured to interface and communicate with a communication system, memory that stores operational instructions, and processing circuitry operably coupled to the interface and to the memory to perform various operations, functions, etc. including transmitting and receiving of signals, processing of signals, etc. For example, the processing circuitry of such a computing device (e.g., in accordance with execution of the operation instructions) is configured to monitor navigation activity of another computing device with one or more websites of a plurality of websites to generate client navigation history and server navigation history. The processing circuitry of such a computing device is also configured to facilitate storage of the client navigation history based on a first blockchain that is supported by a first plurality of computing devices within the communication system (e.g., the first blockchain supported by multiple computing devices within the one or more network segments 416) and to facilitate storage of the server navigation history based on a second blockchain that is supported by a second plurality of computing devices within the communication system (e.g., the first blockchain supported by multiple computing devices within the one or more network segments 416, which may be the same as the multiple computing devices that support the first blockchain, other multiple computing devices, or include one or more common computing devices).

Then, based on a request to deliver tailored content from a website of the plurality of websites to the other computing device, the processing circuitry of such a computing device is also configured to determine whether the client navigation history based on the first blockchain compares favorably to the server navigation history based on the second blockchain. When the client navigation history based on the first blockchain compares favorably to the server navigation history based on the second blockchain, the processing circuitry of such a computing device is also configured to facilitate delivery of the tailored content from the website of the plurality of websites to the other computing device. Alternatively, when the client navigation history based on the first blockchain compares unfavorably to the server navigation history based on the second blockchain, the processing circuitry of such a computing device is configured to block delivery of the tailored content from the website of the plurality of websites to the other computing device and/or generate an error notification for the other computing device.

Considering a specific implementation, a computing device implemented within the one or more network segments 416 is configured to perform such operations including facilitating storage of the client navigation history based on a first blockchain that is supported by a first plurality of computing devices within the communication system (and/or the second blockchain that is supported by a second plurality of computing devices within the communication system) and to perform verification of client navigation history (and/or histories) of one or more computing devices and to determine whether or not the client navigation history (and/or histories) of one or more computing devices compares favorably to corresponding server navigation history (and/or histories) of one or more computing devices that is stored in accordance with one or more blockchains 416a within the communication system. Based on such determination, the computing device implemented within the one or more network segments 416 is configured selectively to deliver certain content to or block certain content from another computing device requesting such content.

FIG. 4B is a diagram illustrating an embodiment 402 of one or more communication systems according to various embodiments of the present invention. One or more network segments 416 provide communication inter-connectivity for at least two computing devices 410 and 412 (e.g., such computing devices may be implemented and operative to support communications with other computing devices in certain examples, and such computing devices may alternatively be referred to as communication devices in such situations including both computing device and communication device functionality and capability). Generally speaking, any desired number of communication devices are included within one or more communication systems (e.g., as shown by communication device 414).

The various communication links within the one or more network segments 416 may be implemented using any of a variety of communication media including communication links implemented as wireless, wired, optical, satellite, microwave, and/or any combination thereof, etc. communication links. In general, the one or more network segments 416 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between devices 410 and 412 may include some segments of wired communication links and other segments of optical communication links. Note also that the devices 410-414 may be of a variety of types of devices including stationary devices, mobile devices, portable devices, etc. and may support communications for any of a number of services or service flows including data, telephony, television, Internet, media, synchronization, etc.

In an example of operation and implementation, device 410 includes a communication interface to support communications with one or more of the other devices 412-414. In an example, the computing device 410 includes a communication interface configured to interface and communicate with a communication network (e.g., the one or more network segments 416), memory that stores operational instructions, and a processor coupled to the communication interface and to the memory. The processor is configured to execute the operational instructions to perform various functions, operations, etc. Note that the communication supported by the computing device 410 may be bidirectional/to and from the one or more of the other computing devices 412-414 or unidirectional (or primarily unidirectional) from the one or more of the other computing devices 412-414.

In one example, computing device 410 includes a processor that generates, modulates, encodes, etc. and transmits signals via a communication interface of the computing device 410 and also receives and processes, demodulates, decodes, etc. other signals received via the communication interface of the computing device 410 (e.g., received from other computing devices such as computing device 412, computing device 414, etc.).

Note also that the communication interface 420 may include functionality to support receipt of user input and output of user output (e.g., via a touchscreen, a keyboard, audio and/or video input/output ports, etc.) to facilitate interaction with one or more users of the computing device 410-1. Such functionality is implemented separately from the communication interface 420 in some examples and is integrated into the communication interface 420 in other examples.

In an example of operation, computing device 410 is configured to monitor navigation activity of computing device 412 with one or more websites of a plurality of websites to generate client navigation history and server navigation history. Then, the computing device 410 is configured to facilitate storage of the client navigation history based on a first blockchain that is supported by a first plurality of computing devices within the communication system (e.g., the one or more network segments 416) and also to facilitate storage of the server navigation history based on a second blockchain that is supported by a second plurality of computing devices within the communication system (e.g., the one or more network segments 416).

Then, based on a request to deliver tailored content from a website of the plurality of websites to the computing device 412, the computing device 410 is configured to determine whether the client navigation history based on the first blockchain compares favorably to the server navigation history based on the second blockchain. When the client navigation history based on the first blockchain compares favorably to the server navigation history based on the second blockchain, the computing device 410 is configured to facilitate delivery of the tailored content from the website of the plurality of websites to the computing device 412. Alternatively, when the client navigation history based on the first blockchain compares unfavorably to the server navigation history based on the second blockchain, the computing device 410 is configured to block delivery of the tailored content from the website of the plurality of websites to the computing device 412 and/or generate an error notification for the computing device 412.

Figure 4C:
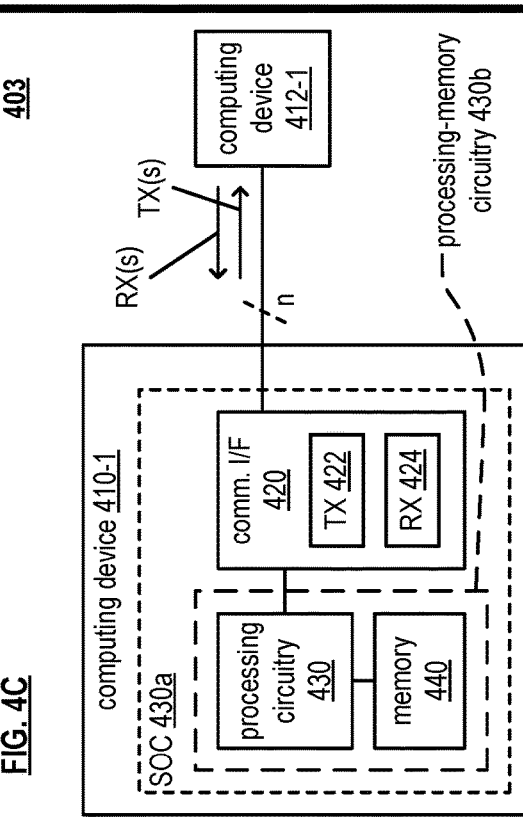
FIG. 4C is a diagram illustrating an embodiment of a computing device configured to operate within one or more communication systems according to various embodiments of the present invention.

FIG. 4C is a diagram illustrating an embodiment 403 of a computing device configured to operate within one or more communication systems according to various embodiments of the present invention. The computing device 410-1 includes a communication interface 420 and processing circuitry 430. The communication interface 420 includes functionality of a transmitter 422 and a receiver 424 to support communications with one or more other devices within a communication system. The computing device 410-1 may also include memory 440 to store information including one or more signals generated by the computing device 410-1 or such information received from other devices (e.g., computing device 412) via one or more communication channels. For example, memory 440 may also include and store various operational instructions for use by the processing circuitry 430 in regard to the processing of messages and/or other received signals and generation of other messages and/or other signals including those described herein (e.g., image and/or video signals). Memory 440 may also store information including one or more types of encoding, one or more types of symbol mapping, concatenation of various modulation coding schemes, etc. as may be generated by the computing device 410-1 or such information received from other devices via one or more communication channels. The communication interface 420 supports communications to and from one or more other devices (e.g., computing device 412-1 and/or other computing devices). Memory 440 may also store information including one or more types of video and/or image processing in accordance with the various aspects, embodiments, and/or examples, and their equivalents, described herein.

Operation of the communication interface 420 may be directed by the processing circuitry 430 such that processing circuitry 430 transmits and receives signals (TX(s) and RX(s)) via the communication interface 120. Generally speaking, computing device 410-1 is able to support communications with one or more other computing device within one or more communication systems including computing device 412-1.

A computing device 410-1 (e.g., which may be any one of computing devices 410, 412, or 414 as with reference to FIG. 4B) is in communication with another computing device 412-1 (and/or any number of other wireless computing devices) via a communication medium. The computing device 410-1 includes a communication interface 420 to perform transmitting and receiving of at least one signal, symbol, packet, and/or frame, etc. (e.g., using a transmitter 422 and a receiver 424) (note that general reference to packet or frame may be used interchangeably).

Generally speaking, the communication interface 420 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the computing device 410-1 operates), equalization, pre-equalization, metric generation, symbol mapping and/or de-mapping, automatic gain control (AGC) operations, and/or any other operations that may be performed by an AFE and/or PHY component within a computing device.

In some implementations, the computing device 410-1 also includes a processing circuitry 430, and an associated memory 440, to execute various operations including interpreting at least one signal, symbol, packet, and/or frame transmitted to computing device 412-1 and/or received from the computing device 412-1 and/or any other computing device. The computing devices 410-1 and 412-1 may be implemented using at least one integrated circuit in accordance with any desired configuration or combination of components, modules, etc. within at least one integrated circuit. Also, the computing devices 410 and/or 412 may each include one or more antennas for transmitting and/or receiving of at least one packet or frame wirelessly (e.g., computing device 410-1 may include m antennas, and computing device 412-1 may include n antennas, where m and n are positive integers).

Also, in some examples, note that one or more of the processing circuitry 430, the communication interface 420 (including the TX 122 and/or RX 124 thereof), and/or the memory 440 may be implemented in one or more "processing modules," "processing circuits," "processors," and/or "processing units" or their equivalents. Considering one example, a system-on-a-chip (SOC) 430*a* may be implemented to include the processing circuitry 430, the communication interface 420 (including the TX 422 and/or RX 424 thereof), and the memory 440 (e.g., SOC 430*a* being a multi-functional, multi-module integrated circuit that includes multiple components therein). Considering another example, processing-memory circuitry 430*b* may be implemented to include functionality similar to both the processing circuitry 430 and the memory 440 yet the communication interface 420 is a separate circuitry (e.g., processing-memory circuitry 430*b* is a single integrated circuit that performs functionality of a processing circuitry and a memory and is coupled to and also interacts with the communication interface 420).

Considering even another example, two or more processing circuitries may be implemented to include the processing circuitry 430, the communication interface 420 (including the TX 422 and/or RX 424 thereof), and the memory 440. In such examples, such a "processing circuitry," "processing circuitry," or "processing circuitries" (or "processor" or "processors") is/are configured to perform various operations, functions, communications, etc. as described herein. In general, the various elements, components, etc. shown within the computing device 410-1 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 410-1 includes both processing circuitry 430 and communication interface 420 configured to perform various operations. In other examples, the computing device 410-1 includes SOC 430*a* configured to perform various operations. In even other examples, the computing device 410-1 includes processing-memory circuitry 430*b* configured to perform various operations. Generally, such operations include generating, transmitting, etc. signals intended for one or more other computing device (e.g., computing device 412-1) and receiving, processing, etc. other signals received for one or more other devices (e.g., computing device 412-1).

In some examples, note that the communication interface 420, which is coupled to the processing circuitry 430, is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 410-1 may be communicated via any of these types of communication systems.

Note that computing device 410-1 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system, among other types of communication systems.

In an example of operation and implementation, a computing device includes a communication interface 420 configured to interface and communicate with a communication network, memory 440 that stores operational instructions, and processing circuitry 430 coupled to the communication interface and to the memory.

The processing circuitry 430 is configured to execute the operational instructions to perform various functions, operations, and processes (sometimes in cooperation with the communication interface 420 and/or the memory 440). In an example, the processing circuitry 430 is configured to monitor navigation activity of computing device 412-1 with one or more websites of a plurality of websites to generate client navigation history and server navigation history. The processing circuitry 430 is also configured to facilitate storage of the client navigation history based on a first blockchain that is supported by a first plurality of computing devices within the communication system and to facilitate storage of the server navigation history based on a second blockchain that is supported by a second plurality of computing devices within the communication system. Then, based on a request to deliver tailored content from a website of the plurality of websites to the computing device 412-1, the processing circuitry 430 is configured to determine whether the client navigation history based on the first blockchain compares favorably to the server navigation history based on the second blockchain. When the client navigation history based on the first blockchain compares favorably to the server navigation history based on the second blockchain, the processing circuitry 130 is configured to facilitate delivery of the tailored content from the website of the plurality of websites to the computing device 412-1. Alternatively, when the client navigation history based on the first blockchain compares unfavorably to the server navigation history based on the second blockchain, the processing circuitry 430 is configured to block delivery of the tailored content from the website of the plurality of websites to the computing device 412-1 and/or generate an error notification for the computing device 412-1.

FIG. 4D is a diagram illustrating an embodiment 404 of a wireless communication system according to various embodiments of the present invention. The wireless communication system includes one or more base stations and/or access points 450, wireless communication devices 460-466 (e.g., wireless stations (STAs)), and a network hardware component 456. The wireless communication devices 460-466 may be laptop computers, or tablets, 460, personal digital assistants 462, personal computers 464 and/or cellular telephones 466 (and/or any other type of wireless communication device). Other examples of such wireless communication devices 460-466 could also or alternatively include other types of devices that include wireless communication capability (and/or other types of communication functionality such as wired communication functionality, satellite communication functionality, fiber-optic communication functionality, etc.). Examples of wireless communication devices may include a wireless smart phone, a cellular phone, a laptop, a personal digital assistant, a tablet, a personal computers (PC), a work station, and/or a video game device.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The one or more base stations (BSs) or access points (APs) 450 are operably coupled to the network hardware 456 via local area network connection 452. The network hardware 456, which may be a router, switch, bridge, modem, system controller, etc., provides a wide area network connection 454 for the communication system. Each of the one or more base stations or access points 450 has an associated antenna or antenna array to communicate with the wireless communication devices in its area. Typically, the wireless communication devices register with a particular base station or access point 450 to receive services from the communication system. For direct connections (i.e., point-to-point communications), wireless communication devices communicate directly via an allocated channel.

Any of the various wireless communication devices (WDEVs) 460-466 and one or more BSs or APs 450 may include a processing circuitry and/or a communication interface to support communications with any other of the wireless communication devices 460-466 and one or more BSs or APs 450. In an example of operation, a processing circuitry and/or a communication interface implemented within one of the devices (e.g., any one of the WDEVs 460-466 and one or more BSs or APs 450) is/are configured to process at least one signal received from and/or to generate at least one signal to be transmitted to another one of the devices (e.g., any other one of the one or more WDEVs 460-466 and one or more BSs or APs 450).

Note that general reference to a communication device, such as a wireless communication device (e.g., WDEVs) 460-466 and one or more BSs or APs 450 in FIG. 4D, or any other communication devices and/or wireless communication devices may alternatively be made generally herein using the term 'device' (e.g., "device" when referring to "wireless communication device" or "WDEV"). Generally, such general references or designations of devices may be used interchangeably.

The processing circuitry and/or the communication interface of any one of the various devices, WDEVs 460-466 and one or more BSs or APs 450, may be configured to support communications with any other of the various devices, WDEVs 460-466 and one or more BSs or APs 450. Such communications may be uni-directional or bi-directional between devices. Also, such communications may be uni-directional between devices at one time and bi-directional between those devices at another time.

In an example, a device (e.g., any one of the WDEVs 460-466 and one or more BSs or APs 450) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 460-466 and one or more BSs or APs 450) includes a processing circuitry to support communications with one or more of the other wireless communication devices (e.g., any other of the WDEVs 460-466 and one or more BSs or APs 450). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 460-466 and one or more BSs or APs 450) includes a processing circuitry, a communication interface, and a memory configured to support communications with one or more of the other wireless communication devices (e.g., any other of the WDEVs 460-466 and one or more BSs or APs 450).

In an example of operation and implementation, WDEV 460 is configured to monitor navigation activity of WDEV 462 with one or more websites of a plurality of websites to generate client navigation history and server navigation history. The WDEV 460 is configured to facilitate storage of the client navigation history based on a first blockchain that is supported by a first plurality of computing devices within the communication system and to facilitate storage of the server navigation history based on a second blockchain that is supported by a second plurality of computing devices within the communication system (e.g., note that the first plurality of computing devices may be the same as or different than the second plurality of computing devices or include one or more common computing devices, and such computing devices may include one or more of the WDEVs 460-466 and/or one or more of the BSs or APs 450). Then based on a request to deliver tailored content from a website of the plurality of websites to the WDEV 462, the WDEV 460 is configured to determine whether the client navigation history based on the first blockchain compares favorably to the server navigation history based on the second blockchain. When the client navigation history based on the first blockchain compares favorably to the server navigation history based on the second blockchain, facilitate delivery of the tailored content from the website of the plurality of websites to the WDEV 462. Alternatively, when the client navigation history based on the first blockchain compares unfavorably to the server navigation history based on the second blockchain, the WDEV is configured to 460 block delivery of the tailored content from the website of the plurality of websites to the WDEV 462 and/or generate an error notification for the WDEV 162.

Figure 5A:
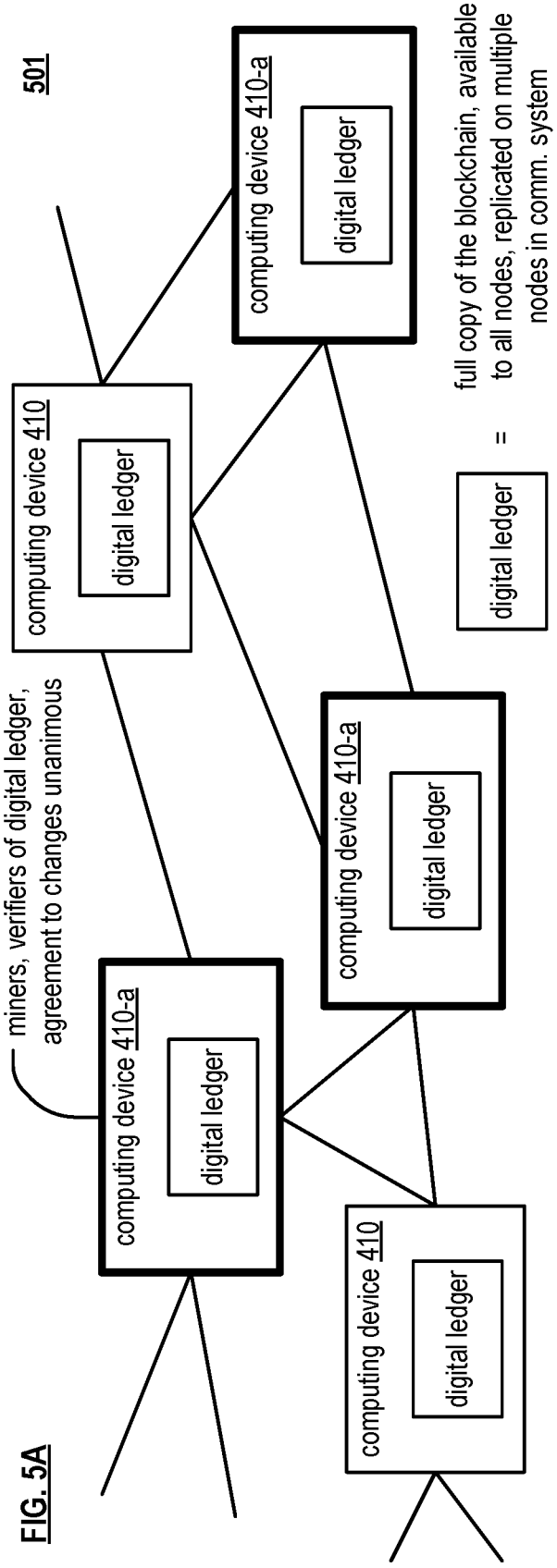
FIG. 5A is a diagram illustrating an embodiment of a blockchain according to various embodiments of the present invention.

FIG. 5A is a diagram illustrating an embodiment 501 of a blockchain according to various embodiments of the present invention. A blockchain allows for distributed and decentralized storing of information in a trusted way across a number of computing devices. for example, information is distributedly stored across a number of computing devices. when a change to the information is requested, it must have 100% consensus, approval, agreement, among a number of computing devices that serve as the keepers, guardians, care-takers, etc. of the integrity of the information. Generally, such computing devices that serve in this capacity within the blockchain may be referred to as miners, verifiers, trusted sources, etc. or other appropriate terminology (note: trusted sources is used generically in certain examples herein). The information that is to be blockchained may replicated across a number of computing devices, but any changes to the information that is to be blockchained must be 100% approved by these trusted sources. Note that all of the computing devices of the blockchain may operate as these trusted sources, or fewer than all of the computing devices of the blockchain may operate as these trusted sources.

Such information that is stored based on blockchain technology may be referred to as an immutable chain (hence the terminology blockchain) that is sometimes also referred to as a ledger, digital ledger, etc. Note that any of a variety of types of information may be stored based on blockchain technology such as financial transactions, user data, etc. In a specific embodiment, browser history and/or browser activity is stored based on blockchain technology. Such browser history and/or browser activity includes client navigation history and server navigation history in some examples. For example, when a computing device performs browsing or navigation via one or more networks (e.g., the Internet, an intranet, a proprietary network, a private network, a public network, etc.), the computing device tracks navigation history and stores it. For example, such a computing device is configured to log, track, store, etc. navigation in accordance with browsing or navigation as performed the computing device 410. Such navigation history stored on a computing device locally may sometimes be referred to as client navigation history. In addition, such navigation history of one or more computing devices is also stored in the one or more network segments such as a cloud computing environment (e.g., a cloud computing environment 50 such as described with reference to FIG. 7). Such navigation history stored remotely on one or more other computing devices within the one or more network segments may sometimes be referred to as sever navigation history.

Referring back to the diagram and blockchain technology, a number of computing devices (e.g., computing devices 410, and computing devices 410-*a*) serve as the miners, verifiers, trusted sources, etc. of digital ledger of the blockchain that is distributedly stored and replicated across a number of computing devices of a communication system. Note that certain of the various computing devices 410 and 410-*a* are selectively connected and/or coupled to one another thereby supporting interconnectivity and communication with respect to the digital ledger of the blockchain. Again, the computing devices 410-*a* may serve as the miners, verifiers, trusted sources, etc. of digital ledger of the blockchain.

Figure 5B:
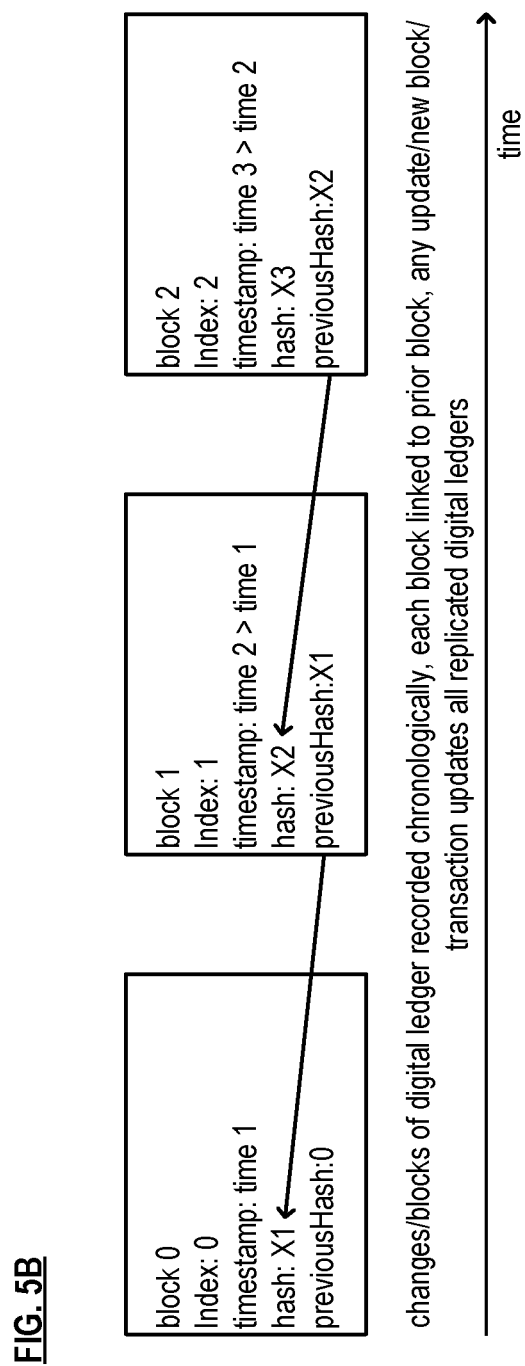
FIG. 5B is a diagram illustrating another embodiment of a blockchain according to various embodiments of the present invention.

FIG. 5B is a diagram illustrating another embodiment 502 of a blockchain according to various embodiments of the present invention. The blockchain is composed of a number of blocks such that each block is particularly related to a prior block in the blockchain. For example, a block 0 respectively includes an index (e.g., 0), timestamp (e.g., time 1), a hash (e.g., X1), and a previous Hash (e.g., 0, because this is the first block in the blockchain and there is no previous Hash corresponding to a prior block). Then, a next block 1 respectively includes an index (e.g., 1), timestamp (e.g., time 2, which is greater than time 1), a hash (e.g., X2), and a previous Hash (e.g., X1, which is the hash, X1, of the prior block in the blockchain). Similarly, a next block 2 respectively includes an index (e.g., 2), timestamp (e.g., time 3, which is greater than time 2), a hash (e.g., X3), and a previous Hash (e.g., X2, which is the hash, X2, of the prior block in the blockchain).

Considering an example of storage of data with respect to the digital ledger of the blockchain, when data is to be stored, a new transaction is initiated and a block (e.g., a new block of the blockchain) is generated that includes the details of transaction. This new block is then provided to all of the computing devices that support the digital ledger of the blockchain. Each block caries a timestamp such as to provide a reference to a previous block in the blockchain and to establish a sequence of the transactions as related to the blockchain. When authenticity of the new block is verified unanimously by the miners, verifiers, trusted sources, etc. of digital ledger of the blockchain, then the new block is appended to the blockchain. Alternatively, when authenticity of the new block is not verified by one or more of the miners, verifiers, trusted sources, etc. of digital ledger of the blockchain, then the new block is not appended to the blockchain.

This chain of blocks may be viewed as the digital ledger of the blockchain that is replicated across all computing devices/nodes of the communication system that are associated with the blockchain. In some examples, the digital ledger of the blockchain is a public digital ledger that is kept by all participating computing devices of the blockchain and optionally also other non-participating computing devices as well. In some examples, the blockchain itself is cryptographically secured thereby making hacking of the information therein extremely difficult and unlikely, if not impossible.

Generally speaking, each new block represents a transaction (e.g., such as an addition of information, a change of information stored therein, deletion of information stored therein, etc.) and includes a hash (e.g., such as in accordance with SHA-2, which is Secure Hash Algorithm 2) is a set of cryptographic hash functions designed by the United States National Security Agency (NSA), SHA-256, which is a member of the SHA-2 cryptographic hash functions designed by the NSA, etc.) that is related to the prior transaction/block/link in the blockchain. In this way, the respective transactions/blocks/links are chain to all previous blocks thereby forming the blockchain.

From certain perspectives, a blockchain may be viewed as being a continuously growing chain of blocks that are linked together and secured using some form of cryptographic hash function. Each block includes a hash pointer such as previous Hash that relates it to a prior/previous block of the blockchain, a timestamp, and the information related to the transaction of that particular block. Note that any changes/blocks of digital ledger are recorded chronologically, each block linked to prior block, and any update/new block/transaction updates all replicated digital ledgers across all of the participating computing devices of the blockchain.

Figure 6:
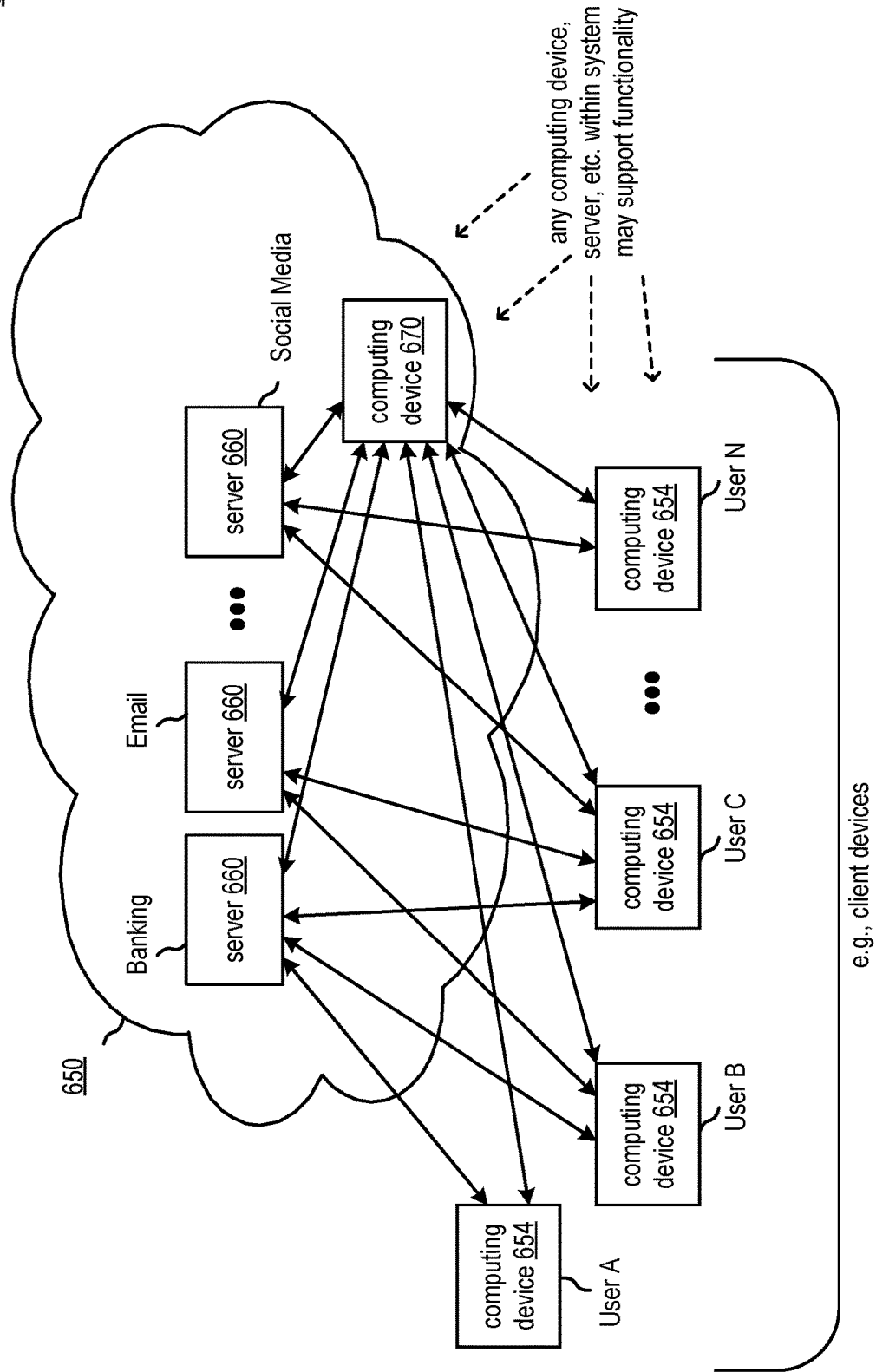
FIG. 6 is a diagram illustrating another embodiment of one or more communication systems supporting blockchain technology according to various embodiments of the present invention.

FIG. 6 is a diagram illustrating another embodiment 600 of one or more communication system supporting blockchain technology according to various embodiments of the present invention. A cloud computing system 650 (e.g., which may be cloud computing system 50 such as in accordance with FIG. 7) includes various components therein and is configured to support communications with a plurality of computing devices 654 (e.g., alternatively referred to as client devices, and each may be generally associated with at least one user, such as to User A, User B, User C, and so on up to User N). The plurality of computing devices 654 (e.g., alternatively referred to as client devices) are configured to communicate bidirectionally with one or more other computing devices such as server systems 660 configured to support any of a number of functions and/or services (e.g., banking, financial, email, social media, etc.) via any of a number of types of connections (e.g., wired, wireless, satellite, fiber-optic, and/or hybrid fiber coax (HFC) network, etc. connections). The system also may include one or more other computing device, such as computing device 670 that is configured to support communication with one or more of the one or more server systems 660, computing devices 654, etc.

Note that some or all server systems 660, and/or some or all client devices 654 can each include an interface configured to support communications with one or more other devices in the communication system, memory to store operational instructions, and/or processing circuitry that is configured to execute the operational instructions to perform various operations, functions etc. and can be implemented by utilizing one or more computing devices including as those as described herein.

Each server system 660 can be managed by or otherwise associated with a service and/or entity that stores or otherwise accesses secure resources such as user account data. Such services and/or entities can include banks, email platforms, messaging platforms, social media platforms, online vendors, credit card companies, utilities companies, or other services. In particular, some or all server systems 660 can store and/or access sensitive user information that require authentication to be accessed by a computing device 654 (e.g., each client device). Furthermore, the computing platforms that implement any of these services can utilize other secure resources such as secure communication links, system passwords, encryption keys, certificates and other security information, application files, utility files, program registries and other program files, device parameters and settings, secure devices such a secure memory or other device, or any other data element, hardware component or software component associated with a computing platform where secure access is desirable or required.

Each computing device 654 (e.g., each client device) can be associated with a user of one or more of the services or entities. For example, a user of the one or more services can have a personal and/or shared account managed by one or more of the services and/or entities, or otherwise seek to access personal information or other information stored by the one or more services and/or entities. A user can utilize their client device to bidirectionally communicate with server systems 660 associated with services and/or entities with which they seek to access information.

Figure 7:
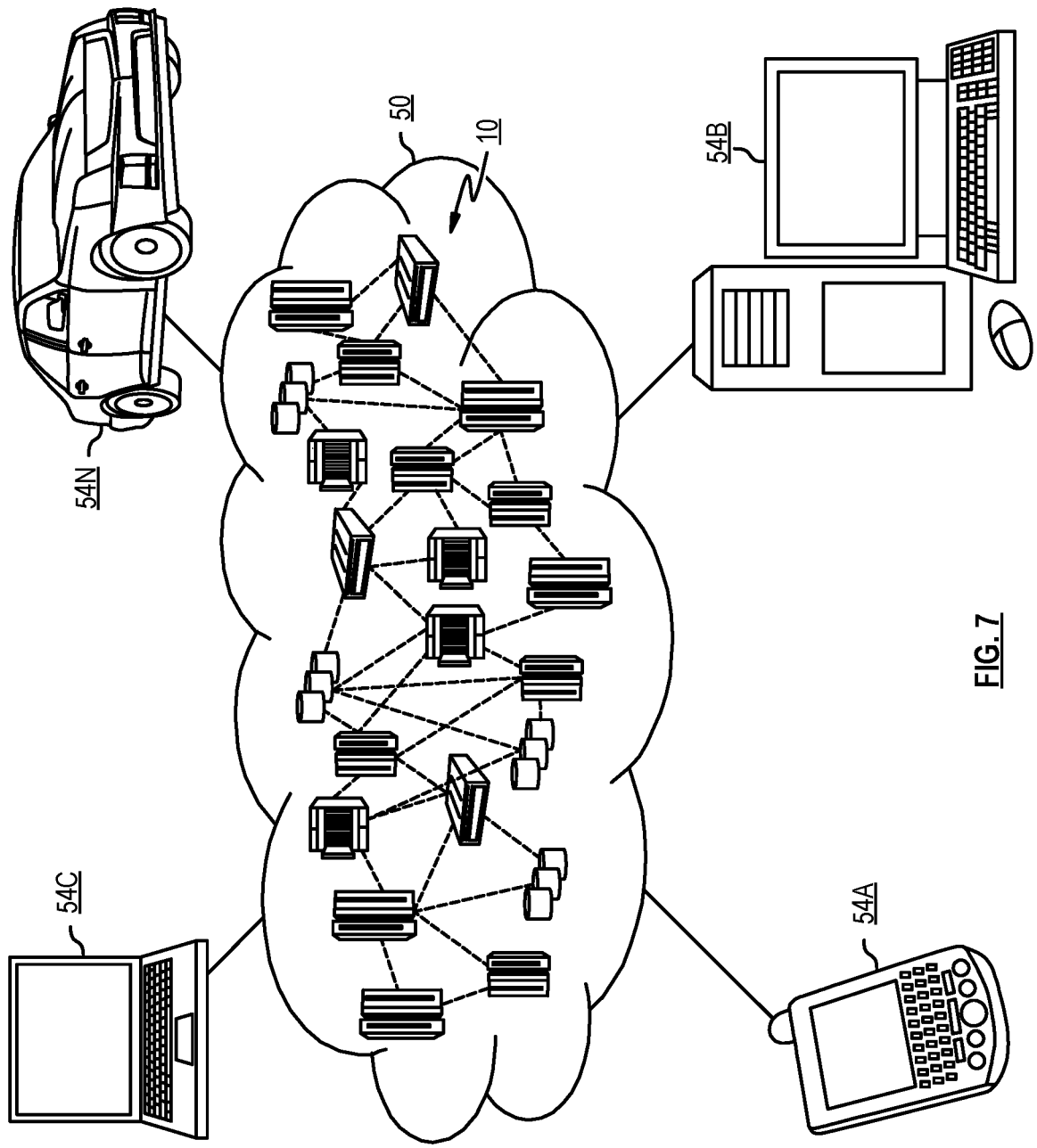
FIG. 7 depicts a cloud computing environment according to various embodiments of the present invention.

In some embodiments, network 650 can be implemented by utilizing the cloud computing environment 50 of FIG. 7. Some or all server systems 660 can communicate with other devices of the system that may include a cloud computing environment 50 of FIG. 7. Some or all server systems 660 can be managed by or otherwise communicate with devices 54A-N of FIG. 7, for example, corresponding to servers and/or administrative devices of the service and/or entity associated with any one of the server systems 660. Some or all computing devices 654 (e.g., client devices) can be implemented by utilizing devices 54A-N of FIG. 7.

Note that any one of the devices described herein such as any one of the computing device 670, the server systems 660, the computing devices 654, etc. may be implemented to support functionality, operations, etc. as described herein.

In an example of operation and implementation, computing device 670 includes an interface configured to interface and communicate with a communication system, memory that stores operational instructions, and processing circuitry operably coupled to the interface and to the memory, that is configured to execute the operational instructions to perform various operations, functions, etc. For example, the computing device 670 is configured to monitor navigation activity of another computing device (e.g., a computing device 654 such as associated with User A) with one or more websites of a plurality of websites to generate client navigation history and server navigation history. The computing device 670 is configured to facilitate storage of the client navigation history based on a first blockchain that is supported by a first plurality of computing devices within the communication system (e.g., within those of the server systems 660 that are first blockchain participants). The computing device 670 is also configured to facilitate storage of the server navigation history based on a second blockchain that is supported by a second plurality of computing devices within the communication system (e.g., within those of the server systems 660 that are second blockchain participants, and that may optionally include one or more of the server systems 660 that are first blockchain participants).

Then, based on a request to deliver tailored content from a website of the plurality of websites to the other computing device (e.g., a computing device 654 such as associated with User A), the computing device 670 is configured to determine whether the client navigation history based on the first blockchain compares favorably to the server navigation history based on the second blockchain. When the client navigation history based on the first blockchain compares favorably to the server navigation history based on the second blockchain, the computing device 670 facilitate delivery of the tailored content from the website of the plurality of websites to the other computing device (e.g., a computing device 654 such as associated with User A).

In some examples, when the client navigation history based on the first blockchain compares unfavorably to the server navigation history based on the second blockchain, the computing device 670 is configured to block delivery of the tailored content from the website of the plurality of websites to the other computing device (e.g., a computing device 654 such as associated with User A) and/or generate an error notification for the other computing device (e.g., a computing device 654 such as associated with User A).

Also, in even other examples, the computing device 670 is configured to process the request to deliver tailored content from the website of the plurality of websites to the other computing device (e.g., a computing device 654 such as associated with User A) to determine whether the request is based on input from a user of the other computing device (e.g., a computing device 654 such as associated with User A). Then based on a determination that the request is not based on any input from the user of the other computing device (e.g., a computing device 654 such as associated with User A), the computing device 670 is configured to block delivery of the tailored content from the website of the plurality of websites to the user of the other computing device (e.g., a computing device 654 such as associated with User A) and/or generate an error notification for the user of the other computing device (e.g., a computing device 654 such as associated with User A).

In even other examples, the computing device 670 is configured to process the request to deliver tailored content from the website of the plurality of websites to the other computing device (e.g., a computing device 654 such as associated with User A) to determine whether the request is based at least in part on input from a user of the other computing device (e.g., a computing device 654 such as associated with User A). Based on a determination that the request is based at least in part on input from the user of the other computing device (e.g., a computing device 654 such as associated with User A), the computing device 670 is configured to deliver the tailored content from the website of the plurality of websites to the other computing device (e.g., a computing device 654 such as associated with User A) after the user has continually visited the website of the plurality of websites for a predetermined period of time (e.g., 30 seconds, 2 minutes, etc. and/or any desired period of time).

Also, in some examples, the computing device 670 is configured to monitor other navigation activity of the other computing device (e.g., a computing device 654 such as associated with User A) with one or more other websites of the plurality of websites to generate other client navigation history and other server navigation history. When the other navigation activity compares favorably with at least one first characteristic of the client navigation history and when the other server navigation history compares favorably with at least one second characteristic of the server navigation history, the computing device 670 is configured to facilitate storage of the other client navigation history based on the first blockchain that is supported by the first plurality of computing devices within the communication system. Also, the computing device 670 is configured to facilitate storage of the other server navigation history based on the second blockchain that is supported by the second plurality of computing devices within the communication system.

In some examples, various aspects, embodiments, and/or examples of the invention operates to use blockchain technology to establish a best of breed record of requests for website activity consensus. Such a socially-enabled consensus blockchain system operates to allow for all participants of the blockchain to participate in the verification. This allows a system-experienced request to be dynamically documented with the highest degree of clarity and accuracy.

In some examples, this operates by establishing a blockchain that can be used to document the request occurrences confirmed by all participants through general consensus of the system. This enables a blockchain to be used as a historical master reference point including creating a digital master content event (or set of events) pertaining to historical real-world events as defined by a grouping or collection of humans based on scope, date, time and any pertaining historical reference points. Also, this provides a blockchain of events that can be considered a digital time capsule (e.g., such as agreed to via multi-user consensus) for later awakening or action at a defined date in future time. This also operates to infuse a blockchain with the ability to differentiate between both physical human and automated requests and hybrid events.

In accordance with a website viewing consensus implementation, various aspects, embodiments, and/or examples of the invention may be configured to operate by allowing involved parties properly to document website activity, and general agreement of what took place during a web session, such as defined points in time. This can operate by transforming a human-computer request into a piece of the blockchain.

In accordance with a retrospective analysis implementation, various aspects, embodiments, and/or examples of the invention may be configured to operate such as certain groups or people may want to "change history" and/or previously-recorded information. The communication system navigation and history tracking described herein may be configured to use ensure no unauthorized modification of history books could be made so long as a blockchain for that history was properly intact.

Alternative aspects, embodiments, and/or examples of the invention may be configured to ensure that links/references are correct and linked to the proper digital assets.

When considering such operations as described herein, one approach operates to determine if a request is physical (e.g., such as based on user input) or automated (e.g., such as computer-auto-generated) in nature. For example, for physical request(s), a User1 initiates a URL/Collaboration request. For example, for Automated Request(s), the system initiates an automated request without the input of User1 (e.g., an application initiates a request to a website without the knowledge of the user). Note there might be gaming of the system to automatically hit certain web pages sites.

Some implementations may operate in accordance with a hybrid approach such that both physical and automated request are included in a combined hybrid request. Such an approach could operates based on pre-request scope and categorization. In some examples, this operates to ascertain if the request should be added to a monitoring queue based on the previous step. Optionally, the system may be configured such that certain behavior are performed on the site before Source2 (e.g., website 2) fulfils the request. One example implementation may include that, upon visiting the site Source2 (e.g., website 2), user1 will have viewed the web page for at least 30 seconds before tailored content is delivered. Then, the request is added to a monitoring queue. In some examples, the user may specifically define that transactions are to be blockchained or the organization may impose this system. The request may be supplemented with priority or user identification detail. Any necessary categorization may be provided with the request.

Blockchain identification is also performed in some examples. For example, from such a monitoring queue, a request (e.g., Request1) is read and the event monitoring system will initiate a communication link to the backend Source1 (e.g., website1). The event monitoring system request that a comparison of Request1 be compared against the work queue of Source1 (e.g., website1).

Request analysis is also performed in some examples. For example, the system may be configured to define the time and place associate with a request (e.g., Request1) (e.g., there may be a time-out for the request analysis such that if the request is not noticed within 2 minutes). Then, the request (e.g., Request1) is removed from the monitoring queue. Also, the system may operate to define occurrence completion criteria, so all involved parties understand the objective and completion criteria associated with completion of the operation.

Then, based on a request occurrence, the request (e.g., Request1) is served to User1.

Thereafter, post request actions may be performed. For example, the system may be configured to fulfil the comparison request (e.g., the request (e.g., Request1) is compared against the work queue of Source1 (e.g., website 1) and a response is sent back to the monitoring system to say that the request (e.g., Request1) has been completed).

The system can perform consensus finalization for the blockchain such that the monitoring system receives user/client and server consensus on the new proposed request. If there is disagreement, the system may be configured to notify the user (e.g., based on an error notification) and rework the request if initiated. If there is no disagreement and 100% consensus is achieved from all participants, then the system may be configured to publish the newly defined and agreed to block to the blockchain so that the blockchain addition is now visible to all authorized participants.

FIG. 7 depicts a cloud computing environment according to various embodiments of the present invention. FIG. 7 presents an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
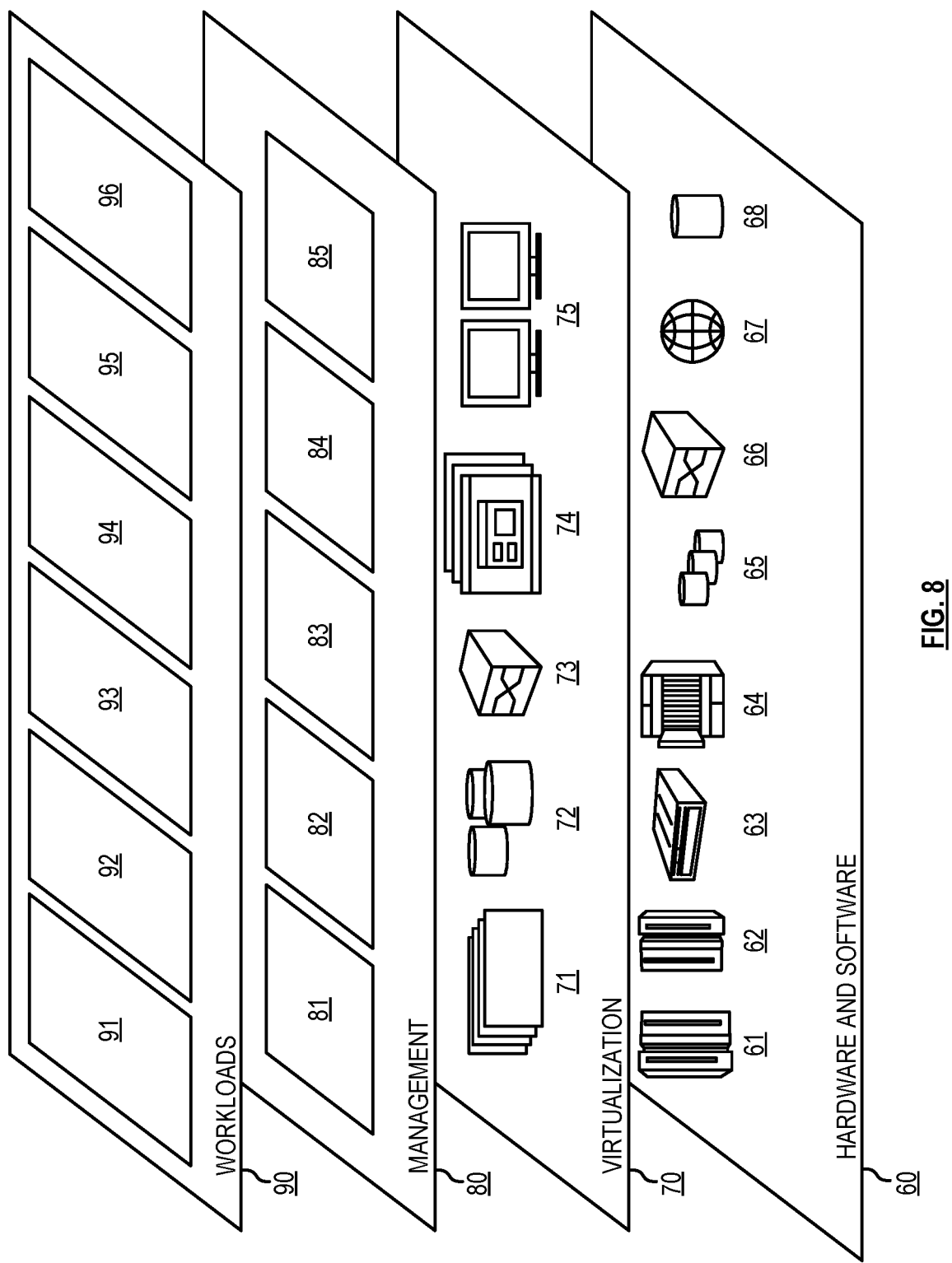
FIG. 8 depicts abstraction model layers according to various embodiments of the present invention.

FIG. 8 depicts abstraction model layers according to various embodiments of the present invention. A set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, one or more hardware components can be implemented by utilizing the computing device 901 of FIG. 9.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication system navigation history tracking, processing, and operations 96.

Figure 9:
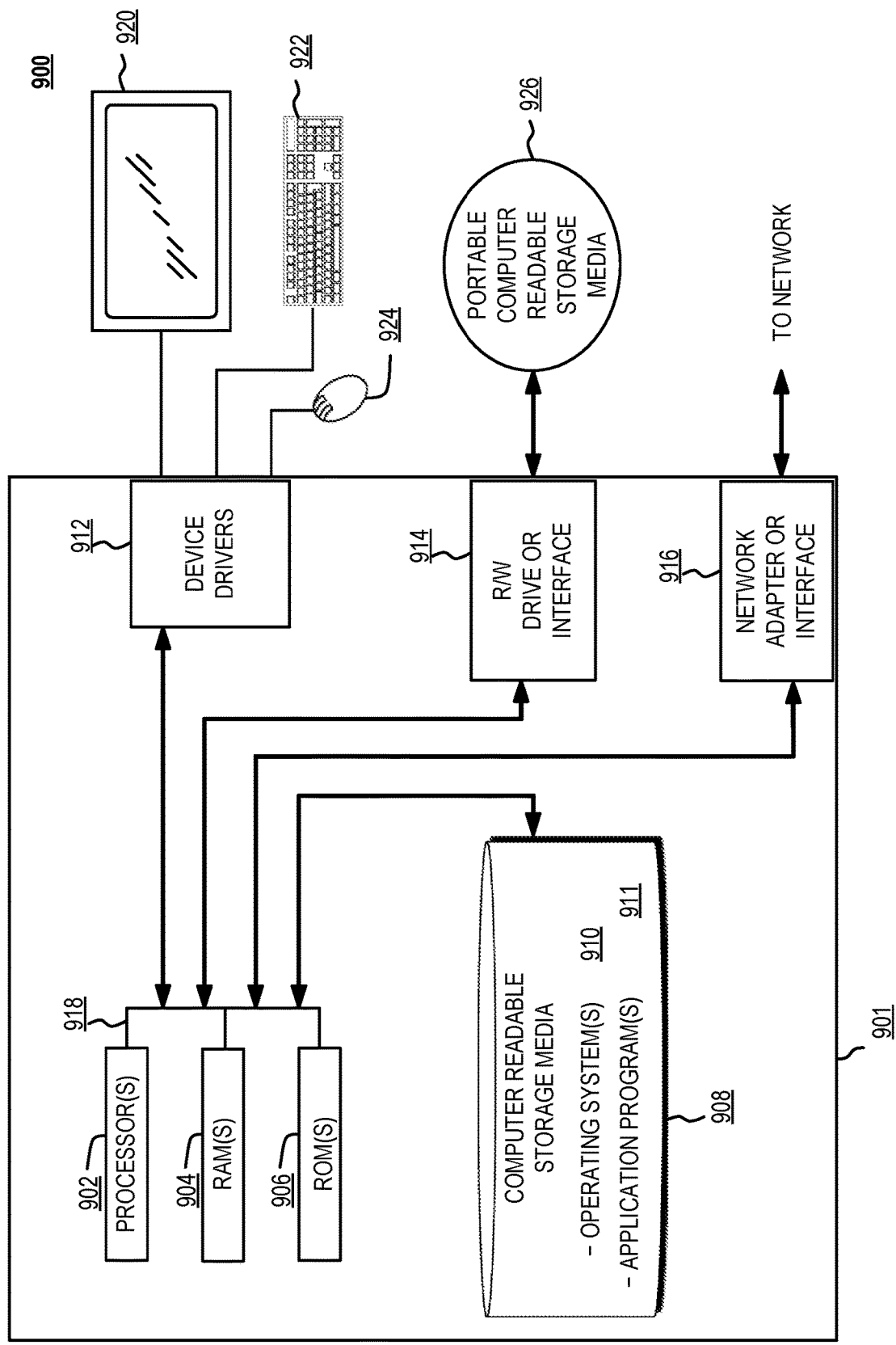
FIG. 9 depicts a block diagram of a computing device according to various embodiments of the present invention.

FIG. 9 depicts a block diagram 900 of a computing device according to various embodiments of the present invention. FIG. 9 depicts a block diagram of components of a computing device 901, which can be utilized to implement some or all of the cloud computing nodes 10, some or all of the computing devices 54A-N of FIG. 7, and/or to implement other computing devices described herein in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 901 can include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 can be implemented with any architecture designed for passing data and/or control information between processors (such as microprocessors, communications and network processors, etc.), system memory, peripheral devices, and any other hardware components within the system.

One or more operating systems 910 and/or application programs 911, such as network application server software 67 and database software 68, are stored on one or more of the computer readable storage media 908 for execution by one or more of the processors 902 via one or more of the respective RAMs 904 (which typically include cache memory). In the illustrated embodiment, each of the computer readable storage media 908 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 901 can also include a R/W drive or interface 914 to read from and write to one or more portable computer readable storage media 926. Application programs 911 on computing devices 901 can be stored on one or more of the portable computer readable storage media 926, read via the respective R/W drive or interface 914 and loaded into the respective computer readable storage media 908.

Computing device 901 can also include a network adapter or interface 916, such as a TCP/IP adapter card or wireless communication adapter. Application programs 911 on computing devices 54A-N can be downloaded to the computing device from an external computer or external storage device via a network (for example, the Internet, a local area network or other wide area networks or wireless networks) and network adapter or interface 916. From the network adapter or interface 916, the programs may be loaded into the computer readable storage media 908. The network may comprise copper wires, optical fibers, wireless transmission, routers, firewalls, switches, gateway computers and edge servers.

Computing device 901 can also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 can comprise hardware and software stored in computer readable storage media 908 and/or ROM 906.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for producing proof of existence of an object within a dispersed storage network (DSN), comprising the steps of:
    sending, to the DSN, a proof of existence request for an object previously stored in the DSN, wherein the proof of existence request includes an object name, an object version, a start time and an end time;
    reading object metadata of the object associated with the object name;
    checking a revision history from the object metadata to ensure the object existed by the start time through the end time with no deletions;
    if the object did not exist by the start time through the end time with no deletions, rejecting the proof of existence request and returning an error response; and
    if the object did exist by the start time through the end time with no deletions, producing and returning an attestation comprising verification information related to the object; and
    accepting the object, based on the verification information, to a blockchain.

2. The method of claim 1, wherein the object version includes any object version over a time range of the start time to the end time that includes the object name.

3. The method of claim 1, wherein the start time is considered a current time.

4. The method of claim 1, wherein the end time is considered equal to the start time.

5. The method of claim 1, wherein the attestation includes one or more of: the object name, the object version, an object hash, a time range, a distributed storage (DS) processing unit ID, a requester ID, a time the object was written, and the time the proof of existence request was processed.

6. The method of claim 5, wherein the attestation includes a digital signature and a digital certificate containing a public key used to verify the digital signature.

7. The method of claim 1 further comprises including a proof of deletion, when the object has been deleted, that includes one or more of: the object name, an object version, a start time, and end time.

8. The method of claim 7 further comprises the DSN retaining, in DSN memory, object metadata when content of the object is deleted.

9. The method of claim 1, wherein the object metadata retains an entire version history for the object, when each version is written, and when each version is deleted.

10. A computing device comprises:
    an interface configured to interface and communicate with a communication system;
    memory that stores operational instructions; and
    processing circuitry operably coupled to the interface and to the memory, wherein the processing circuitry is configured to execute the operational instructions to integrate a distributed ledger represented by a blockchain with a distributed storage network (DSN) by:
    sending, to the DSN, a proof of existence request for an object previously stored in the DSN, wherein the proof of existence request includes an object name, an object version, a start time and an end time;
    reading object metadata of the object associated with the object name;
    checking a revision history from the object metadata to ensure the object existed by the start time through the end time with no deletions;
    if the object did not exist by the start time through the end time with no deletions, rejecting the proof of existence request and returning an error response; and
    if the object did exist by the start time through the end time with no deletions, producing and returning an attestation comprising verification information related to the object; and
    accepting the object, based on the verification information, to the blockchain.

11. The computing device of claim 10, wherein the attestation includes one or more of: the object name, the object version, an object hash, a time range, a distributed storage (DS) processing unit ID, a requester ID, a time the object was written, and the time the proof of existence request was processed.

12. The computing device of claim 10, wherein the attestation includes a digital signature and a digital certificate containing a public key used to verify the digital signature.

13. The computing device of claim 10 further comprises including a proof of deletion, when the object has been deleted, that includes one or more of: the object name, an object version, a start time, and end time.

14. The computing device of claim 10 further comprises the DSN retaining, in DSN memory, object metadata when content of the object is deleted, wherein the object metadata includes an entire version history for the object, when each version is written, and when each version is deleted.

* * * * *

UNITED STATES PATENT AND TRADEMARK OFFICE
CERTIFICATE OF CORRECTION

| | | |
|---|---|---|
| PATENT NO. | : 11,108,559 B2 | |
| APPLICATION NO. | : 16/237975 | |
| DATED | : August 31, 2021 | |
| INVENTOR(S) | : Jason K. Resch et al. | |

It is certified that error appears in the above-identified patent and that said Letters Patent is hereby corrected as shown below:

On the Title Page

Item (72)
Change spelling of inventor Name: "Michele Martino Franceshini", to --Michele Martino Franceschini--.

Signed and Sealed this
Thirty-first Day of May, 2022

Katherine Kelly Vidal
Director of the United States Patent and Trademark Office